US012600414B2

(12) United States Patent
Nakamura et al.

(10) Patent No.: US 12,600,414 B2
(45) Date of Patent: Apr. 14, 2026

(54) VEHICLE

(71) Applicants: TOYOTA JIDOSHA KABUSHIKI KAISHA, Toyota (JP); SUBARU CORPORATION, Tokyo (JP)

(72) Inventors: Kentaro Nakamura, Toyota (JP); Daisuke Suewaka, Shibuya-ku (JP); Satoshi Ikeda, Shibuya-ku (JP); Ryotaro Fujikawa, Shibuya-ku (JP)

(73) Assignees: TOYOTA JIDOSHA KABUSHIKI KAISHA, Toyota (JP); SUBARU CORPORATION, Tokyo (JP)

( * ) Notice: Subject to any disclaimer, the term of this patent is extended or adjusted under 35 U.S.C. 154(b) by 352 days.

(21) Appl. No.: 18/242,585

(22) Filed: Sep. 6, 2023

(65) Prior Publication Data

US 2024/0092427 A1 Mar. 21, 2024

(30) Foreign Application Priority Data

Sep. 20, 2022 (JP) ................................. 2022-149463

(51) Int. Cl.
| | |
|---|---|
| *B62D 21/15* | (2006.01) |
| *B60K 1/04* | (2019.01) |
| *B62D 25/02* | (2006.01) |
| *B62D 25/20* | (2006.01) |

(52) U.S. Cl.
CPC ......... *B62D 21/157* (2013.01); *B62D 25/025* (2013.01); *B62D 25/2036* (2013.01); *B60K 2001/0438* (2013.01)

(58) Field of Classification Search
CPC .... B62D 21/157; B62D 25/20; B62D 25/025; B62D 25/2036; B60R 2021/0006; B60K 1/04; B60K 2001/0438; B60J 2001/0438
See application file for complete search history.

(56) References Cited

U.S. PATENT DOCUMENTS

| | | | | |
|---|---|---|---|---|
| 10,913,340 B2* | 2/2021 | Tsuyuzaki | ................ | B60K 1/04 |
| 2013/0088045 A1* | 4/2013 | Charbonneau | ..... | B62D 25/2036 |
| | | | | 296/187.12 |
| 2018/0236863 A1* | 8/2018 | Kawabe | ................... | B60K 1/04 |
| 2019/0248423 A1* | 8/2019 | Kato | .................... | B62D 25/025 |
| 2019/0382051 A1* | 12/2019 | Toyota | ................... | B62D 25/02 |
| 2020/0114972 A1* | 4/2020 | Lee | ........................... | B60K 1/04 |
| 2020/0140021 A1* | 5/2020 | Grottke | ................ | B62D 25/025 |

(Continued)

FOREIGN PATENT DOCUMENTS

JP 2021-112924 A 8/2021

*Primary Examiner* — Gregory A Blankenship
(74) *Attorney, Agent, or Firm* — Dinsmore & Shohl LLP

(57) ABSTRACT

A vehicle may include a battery pack located below the floor panel; an energy absorber extending along a side surface of the battery pack in the front-rear direction and facing the side sill from below; and a cover plate covering a lower surface of the battery pack from below. The energy absorber may include an inner part facing the side surface of the battery pack and an outer part located outside in a left-right direction of the vehicle with respect to the inner part. An end of the cover plate in the left-right direction may be fixed to a lower surface of the inner part of the energy absorber with a plurality of fasteners. A lower surface of the outer part may protrude downward relative to the lower surface of the inner part and is located lower than lower ends of the plurality of fasteners.

6 Claims, 5 Drawing Sheets

(56)  References Cited

U.S. PATENT DOCUMENTS

| | | | |
|---|---|---|---|
| 2021/0078638 A1* | 3/2021 | Hirota | B62D 25/025 |
| 2022/0111902 A1* | 4/2022 | Han | B62D 25/2018 |
| 2022/0227214 A1* | 7/2022 | Yaita | B60K 1/04 |
| 2022/0227215 A1* | 7/2022 | Ishizaki | B62D 21/157 |
| 2022/0258585 A1* | 8/2022 | Yaita | H01M 50/242 |
| 2023/0070480 A1* | 3/2023 | Song | B62D 25/025 |
| 2023/0101665 A1* | 3/2023 | Inami | B62D 25/025 |
| | | | 180/68.5 |
| 2023/0211826 A1* | 7/2023 | Carl | B62D 25/025 |
| | | | 296/187.12 |
| 2023/0249533 A1* | 8/2023 | Satou | B60K 1/04 |
| | | | 180/68.5 |
| 2023/0311795 A1* | 10/2023 | Mukaigawa | B60R 16/04 |
| | | | 180/68.5 |
| 2024/0075800 A1* | 3/2024 | Asa | B60K 1/04 |
| 2024/0092427 A1* | 3/2024 | Nakamura | B62D 25/2036 |
| 2025/0236339 A1* | 7/2025 | Chikita | B62D 25/025 |
| 2025/0296628 A1* | 9/2025 | Boettcher | B62D 25/025 |
| 2025/0296634 A1* | 9/2025 | Boettcher | B62D 25/025 |
| 2025/0296635 A1* | 9/2025 | Boettcher | B62D 21/157 |

* cited by examiner

VEHICLE

CROSS-REFERENCE TO RELATED APPLICATIONS

This application claims priority from Japanese Patent Application No. 2022-149463 filed on Sep. 20, 2022. The entire content of the priority application is incorporated herein by reference.

BACKGROUND ART

An art disclosed herein relates to a vehicle.

Japanese Patent Application Publication No. 2021-112924 describes a vehicle. This vehicle includes a battery pack positioned below a floor panel and an energy absorber disposed along a side surface of the battery pack.

SUMMARY

When a lateral collision occurs in a vehicle, collision energy from a lateral side is absorbed by an energy absorber. Due to this, a battery pack is protected. The present teachings provide a novel art configured to improve collision energy absorption by an energy absorber.

The techniques disclosed herein are embodied in a vehicle. In a first aspect of the present teachings, a vehicle may comprise: a floor panel; a side sill extending along a side edge of the floor panel in a front-rear direction of the vehicle; a battery pack located below the floor panel; an energy absorber extending along a side surface of the battery pack in the front-rear direction and facing the side sill from below; and a cover plate covering a lower surface of the battery pack from below. The energy absorber may comprise an inner part facing the side surface of the battery pack and an outer part located outside in a left-right direction of the vehicle with respect to the inner part. An end of the cover plate in the left-right direction may be fixed to a lower surface of the inner part of the energy absorber with a plurality of fasteners. A lower surface of the outer part may protrude downward relative to the lower surface of the inner part and is located lower than lower ends of the plurality of fasteners.

In the vehicle herein mentioned, the energy absorber includes the inner part and the outer part. The inner part of the energy absorber is fixed to the cover plate disposed below the battery pack. Due to this, when collision load is applied on the energy absorber from a vehicle lateral side, the energy absorber is supported by the cover plate from a vehicle inner side. Also, the outer part of the energy absorber is enlarged downward at a greater degree than the inner part, and thus an amount of collision energy thereby absorbed upon deformation of the energy absorber is relatively larger than the inner part. These configurations allow to improve collision energy absorption by the energy absorber. In addition, the plural fasteners fixing the cover plate to the energy absorber are positioned higher than the lower surface of the outer part of the energy absorber, by which these fasteners can be suppressed from coming into contact with a foreign object.

BRIEF DESCRIPTION OF DRAWINGS

In FIG. 5, illustration of the energy absorber 30 is omitted.

DETAILED DESCRIPTION

In the following, configurations of the technology disclosed in the present specification are listed following the first aspect.

In a second aspect of the present teachings according to the first aspect as above, the end of the cover plate may comprise a plurality of first portions and a plurality of second portions, wherein the first portions and the second portions are alternately arranged one by one along the front-rear direction. In this case, the plurality of first portions may comprise a plurality of fixed portions at each of which corresponding one of the plurality of fasteners is arranged. The plurality of second portions may protrude downward relative to the plurality of first portions. According to this configuration, rigidity of the cover plate at its end can be enhanced, and thus the energy absorber can be supported by the cover plate from a vehicle inner side.

In a third aspect of the present teachings, lower ends of the plurality of second portions may be located lower than the lower ends of the plurality of fasteners. According to this configuration, these fasteners may be suppressed from coming into contact with a foreign object.

In a fourth aspect of the present teachings according to any of the first to third aspects, the vehicle may further comprise a bracket facing an upper surface of the energy absorber and disposed on the side surface of the battery pack. In this case, the inner part of the energy absorber may be located between the bracket and the cover plate. The plurality of fasteners may fasten the bracket, the cover plate, and the inner part of the energy absorber altogether. According to this configuration, three members, i.e., the energy absorber, the cover plate, and the bracket can be firmly fixed to one another by relatively a small number of fasteners.

In a five aspect of the present teachings, the bracket may comprise a plurality of third portions and a plurality of fourth portions, wherein the third portions and the fourth portions are alternately arranged one by one along the front-rear direction. In this case, the plurality of third portions may comprise a plurality of fixed portions at each of which corresponding one of the plurality of fasteners is arranged. The plurality of fourth portions may protrude upward relative to the plurality of third portions. According to this configuration, the rigidity of the bracket can be enhanced and thus the energy absorber can be strongly supported by the bracket from the vehicle inner side.

Embodiments

Figure 1:
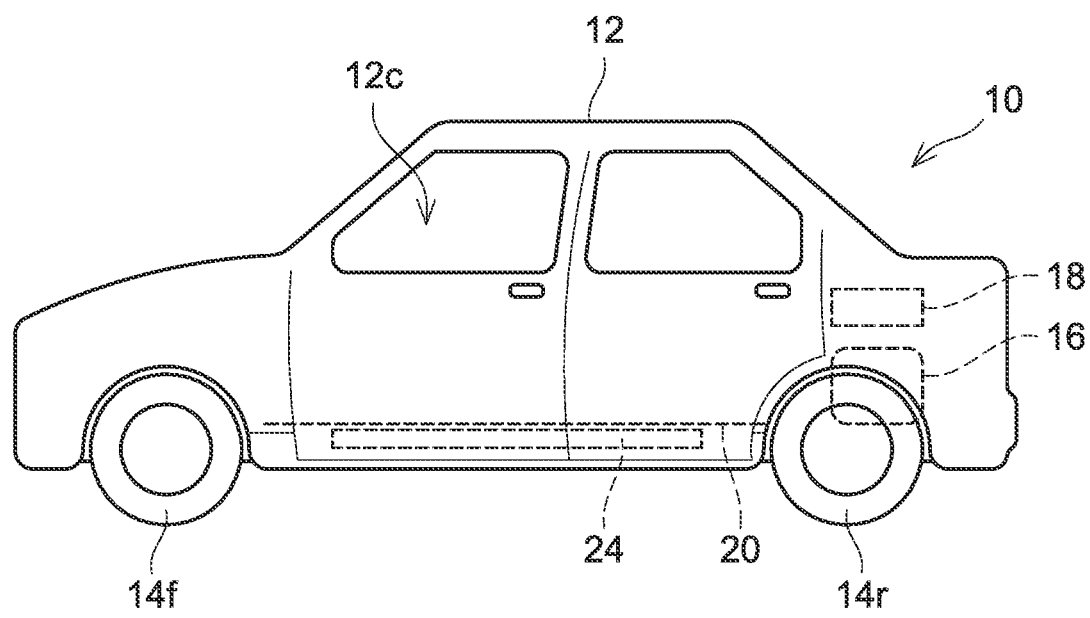
FIG. 1 illustrates a configuration of a vehicle 10.
Figure 1:
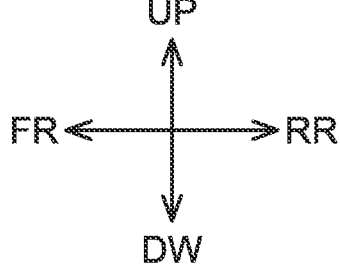

With reference to drawings, a vehicle 10 according to an embodiment will be described. As shown in FIG. 1, the vehicle 10 comprises wheels 14f, 14r, a vehicle body 12, a traction motor 16, a power converter 18, and a battery pack 24. The vehicle 10 is an electric vehicle. The vehicle 10 is the electric vehicle configured to run by driving the wheels 14f and/or 14r with the traction motor 16.

The traction motor 16 is configured to be driven by power supplied from the battery pack 24 through the power converter 18. The power converter 18 is configured to convert direct current from the battery pack 24 to alternate current and supply the same to the traction motor 16. The plural wheels 14f, 14r include a pair of front wheels 14f and a pair of rear wheels 14r. In the present embodiment, the motor 16 drives the rear wheels 14r, for example. The vehicle body 12 is constituted of a metal such as steel material and aluminum alloy. The vehicle body 12 includes a compartment 12c. The compartment 12c is a space for passenger(s) of the vehicle 10 to be in.

Figure 2:
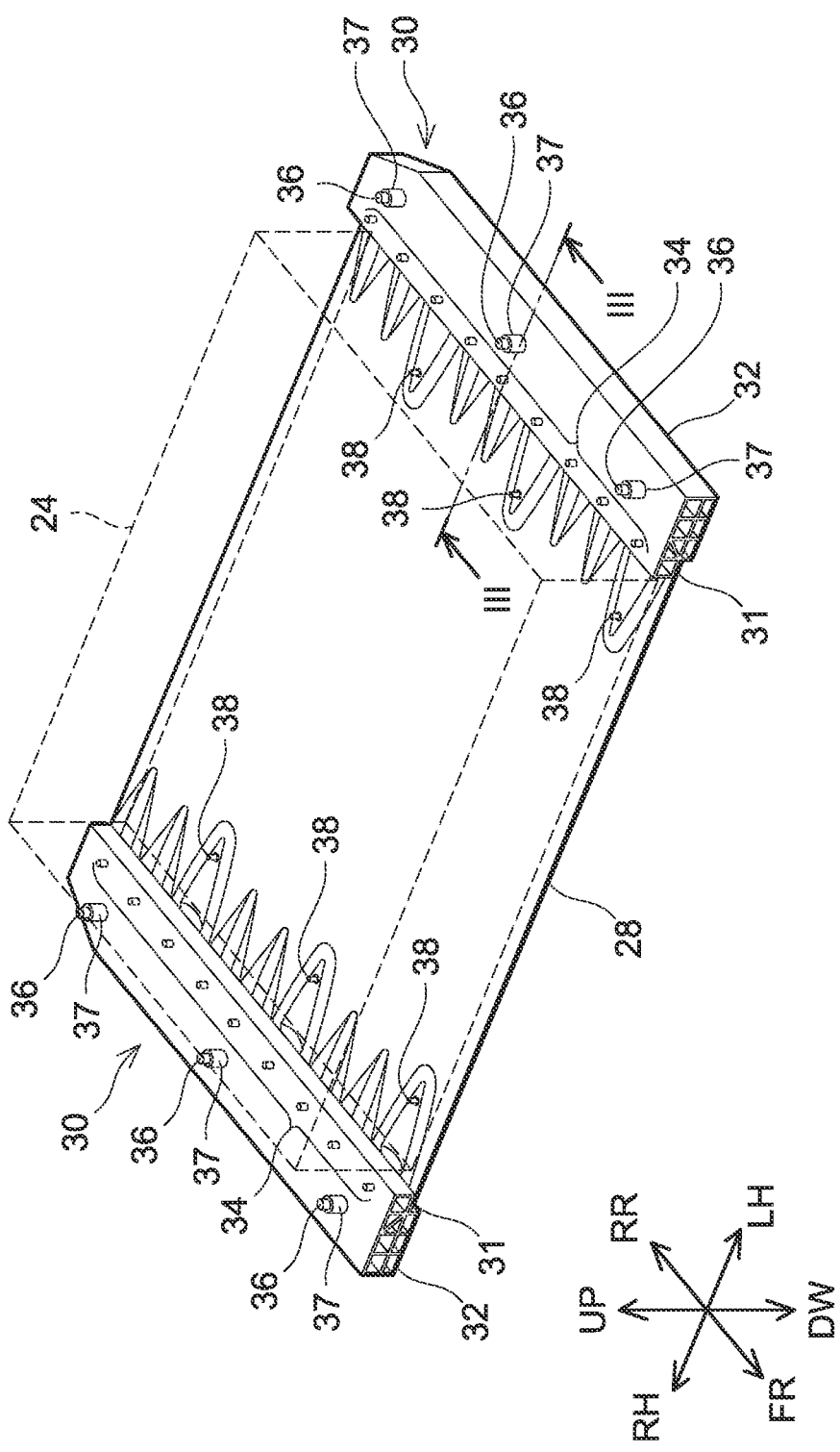
FIG. 2 illustrates surrounding structures of a rear part of a battery pack 24.
Figure 3:
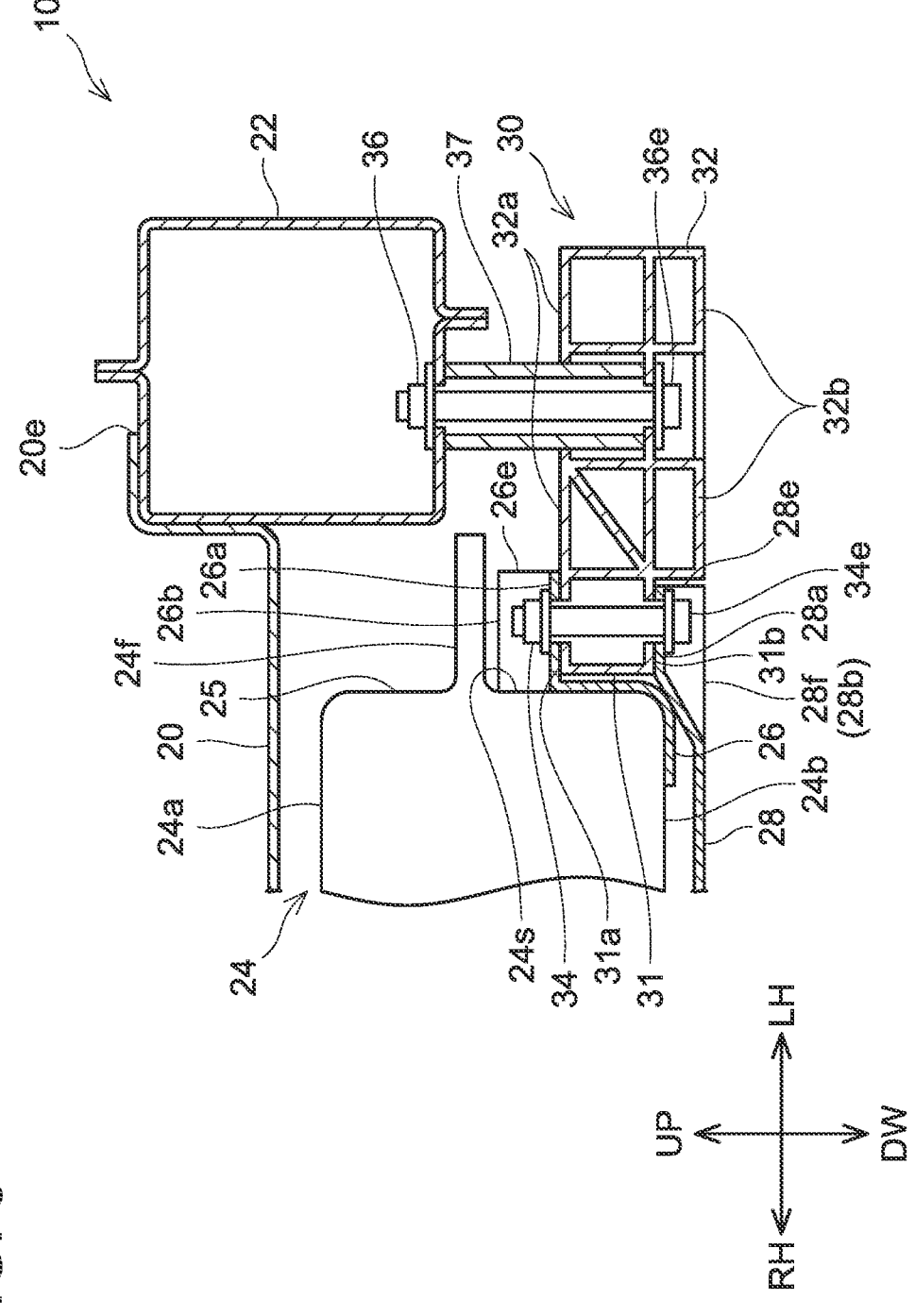
FIG. 3 illustrates a cross-sectional view of the vehicle 10 taken along a line III-III of FIG. 2 and illustrates an internal structure of the vehicle 10.

With reference to FIGS. 2 and 3, an internal structure of the vehicle 10 will be described. As shown in FIG. 3, the vehicle body 12 includes a floor panel 20 and a pair of side sills 22. The floor panel 20 is a plate member. The floor panel 20 constitutes a floor of the compartment 12c. The pair of side sills 22 is each tubular, and comprises a left side sill 22 and a right side sill (not shown). The left side sill 22 extends in a front-rear direction along a left lateral edge 20e of the floor panel 20. Although not shown, the right side sill extends in the front-rear direction along a right lateral edge of the floor panel 20. Hereinafter, the left side sill 22 will simply be referred to as "side sill 22". The battery pack 24 is positioned below the floor panel 20. The battery pack 24 comprises a plurality of battery cells (not shown) and a casing 25. The casing 25 is a box-shaped member and houses the plurality of battery cells therein. The battery pack 24 has an upper surface 24a, a lower surface 24b, and a side surface 24s positioned between the upper surface 24a and the lower surface 24b. Although not particularly limited, the battery pack 24 comprises a flange 24f protruding laterally from the side surface 24s.

As shown in FIGS. 2 and 3, the vehicle 10 comprises left and right brackets 26, left and right energy absorbers (EA) 30, and the cover plate 28. The cover plate 28 is a plate member, and covers the lower surface 24b of the battery pack 24 from below. The cover plate 28 is constituted of metal, such as aluminum. The cover plate 28 may not be however limited to metal, but may be constituted of resin. The left and right EAs 30 are arranged respectively on the left side and the right side of the battery pack 24. Each EA 30 is fixed to the battery pack 24 via the corresponding one of brackets 26. Configurations of these left and right EAs 30 are substantially the same as each other, and thus, the left EA 30 (hereafter, simply referred to as "EA 30") will be mainly described hereinafter. Similarly, as to configurations of the left and right brackets 26, the left bracket 26 (hereafter, simply referred to as "bracket 26") will be mainly described hereinafter.

The EA 30 is a member configured to absorb collision energy upon collision of the vehicle 10. If something hits on the vehicle 10 from its lateral side, the EA 30 deforms to absorb the collision energy, by which the battery pack 24 can be suppressed from being deformed. The EA 30 is constituted of metal such as aluminum. The EA 30 extends in the front-rear direction along the side surface 24s of the battery pack 24. Plural hollow spaces divided by partitions extend along the front-rear direction inside the EA 30. The EA 30 faces the side sill 22 from below. The EA 30 includes an inner part 31 and an outer part 32. The inner part 31 faces the side surface 24s of the battery pack 24. A lower surface 31b of the inner part 31 has an end 28e of the cover plate 28 fixed thereto by a plurality of first fasteners 34. A bolt may be implemented as each first fastener 34, for example. The outer part 32 is positioned outside in the left-right direction relative to the inner part 31. A lower surface 32b of the outer part 32 protrudes downward relative to the lower surface 31b of the inner part 31. An upper surface 32a of the outer part 32 is positioned on a plane substantially the same as an upper surface 31a of the inner part 31. The lower surface 32b of the outer part 32 is positioned lower than lower ends 34e of the plurality of first fasteners 34. Further, the outer part 32 is fixed to the side sill 22 with second fasteners 36. At each of these fixation points, a collar 37 extending from inside the outer part 32 up to a position below the side sill 22 is arranged. The second fasteners 36 penetrates the respective collars 37 and thus fasten the side sill 22 and the EA 30 with each other. Each of the collars 37 is a tubular member and functions as a spacer. The EA 30 is stably fixed to the side sill 22 without deformation by the collars 37 arranged at these fixation points. The lower surface 32b of the outer part 32 is located lower than lower ends 36e of the second fasteners 36 at these fixation points. Due to this, the second fasteners 36 are suppressed from coming into contact with foreign objects. Here, the plurality of first fasteners 34 is an example of "plurality of fasteners" in the art disclosed herein.

The bracket 26 is a flexed plate member and constituted of a metal, for example. The bracket 26 is joined to a lower part of the battery pack 24 (i.e., so-called lower case). The bracket 26 protrudes leftward from the side surface 24s of the battery pack 24. A projecting portion 26e of the bracket 26 faces the upper surface 31a of the inner part 31 of the EA 30. The inner part 31 of the EA 30 is positioned between the bracket 26 and the cover plate 28. The plurality of first fasteners 34 fixes three members altogether with each other, namely, the bracket 26, the cover plate 28, and the inner part 31 of the EA 30. According to this configuration, the EA 30, the cover plate 28, and the bracket 26 are strongly fixed to each other with a relatively small number of fasteners.

Figure 4:
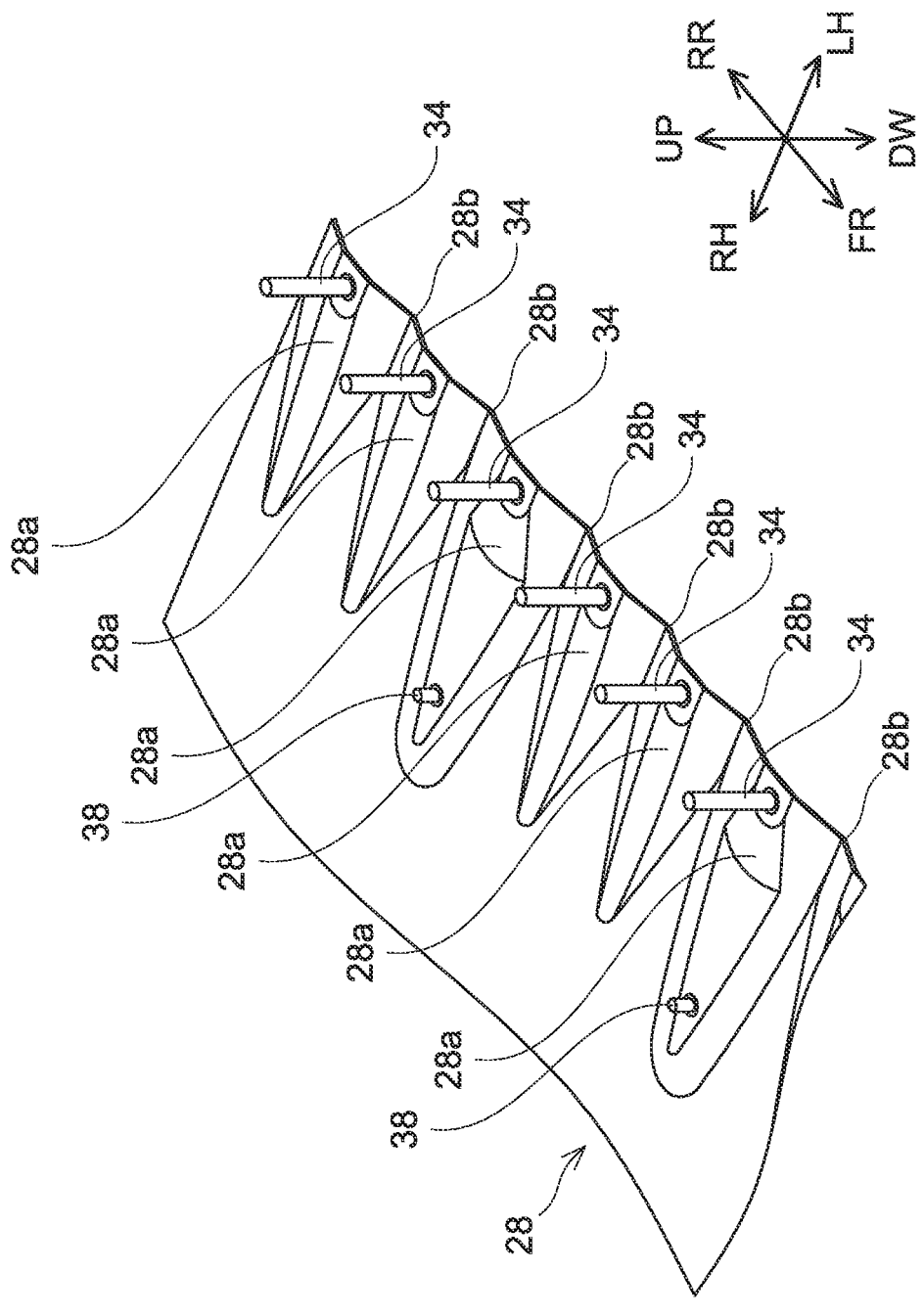
FIG. 4 illustrates a structure of an end of a cover plate 28.
Figure 5:
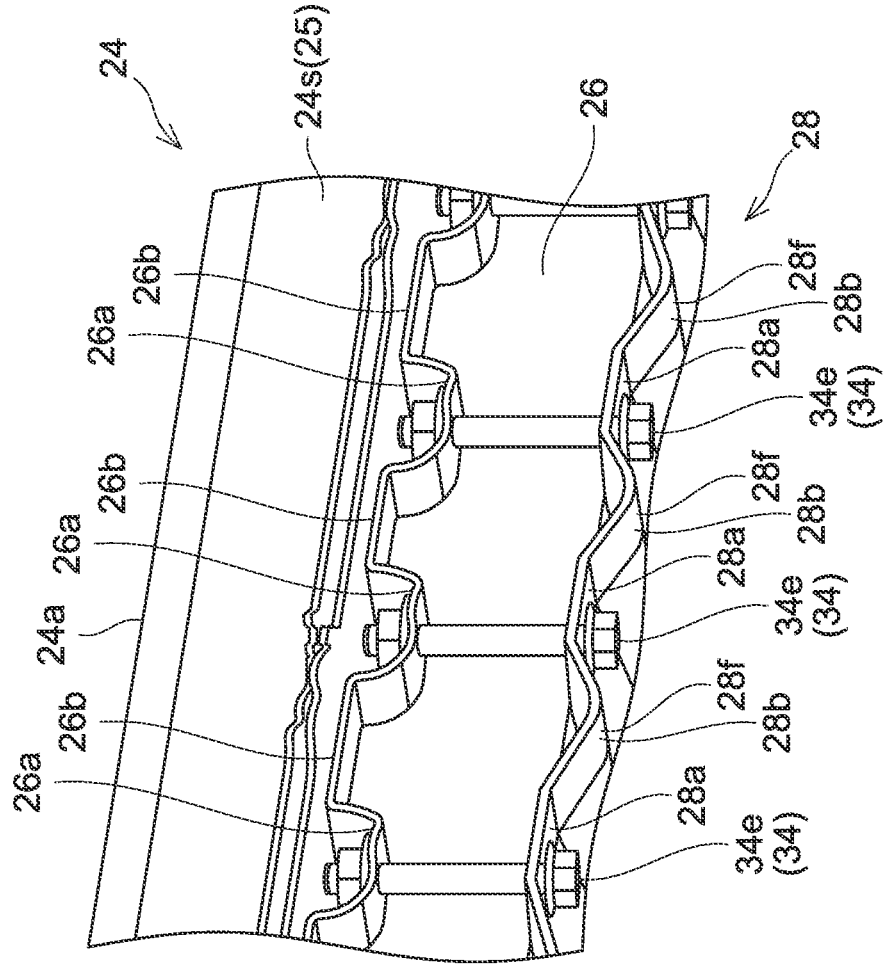
FIG. 5 illustrates structures of the end of the cover plate 28 and an end of a bracket 26.
Figure 5:
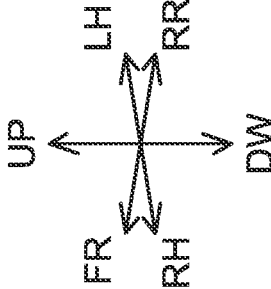

Subsequently, with reference to FIGS. 4 and 5, a structure of an end of the cover plate 28 and a structure of an end of the bracket 26 will be described. As shown in FIGS. 4 and 5, the end 28e of the cover plate 28 has a plurality of first portions 28a and a plurality of second portions 28b. The plural first portions 28a and the plural second portions 28b are alternately aligned one by one along the front-rear direction. Each of the first portions 28a comprises a fixation point at which corresponding one of the first fasteners 34 is arranged. The plurality of second portions 28b projects downward relative to the first portions 28a. That is, the end 28e of the cover plate 28 has a wave shape which curves up and down in a repetitious manner along the front-rear direction. According to this configuration, the end 28e of the cover plate 28 has reinforced rigidity and the EA 30 is firmly supported by the cover plate 28 from a vehicle inner side. Although not particularly limited, the wave shape of the end 28e of the cover plate 28 extends until a spot which faces the lower surface 24b of the battery pack 24. When the wave shape is arranged over a relatively wide range as such at the end 28e of the cover plate 28, the rigidity of the cover plate 28 can further be enhanced. In addition, in the cover plate 28, lower ends 28f of the plurality of second portions 28b are positioned lower than the lower ends 34e of the plurality of first fasteners 34. According to this configuration, these first fasteners 34 can be suppressed from coming into contact with foreign object(s). The cover plate 28 comprises a plurality of fixation points fixed to the lower surface 24b of the battery pack 24. These plural fixation points are arranged on the vehicle inner side from the fixation points at which the plurality of first fasteners 34 is disposed. The cover plate 28 is fixed to the battery pack 24 by a plurality of fasteners 38 at these fixation points.

The bracket 26 comprises a plurality of third portions 26a and a plurality of fourth portions 26b. The plural third portions 26a and the plural fourth portions 26b are alternately aligned one by one along the front-rear direction. Each of the fourth portions 26*b* projects upward relative to the adjacent third portion(s) 26*a*. Each of the plural third portions 26*a* comprises a fixation point at which a corresponding one of the first fasteners 34 is arranged. The plural fourth portions 26*b* project upward relative to the third portions 26*a*. That is, the projecting portion 26*e* of the bracket 26 has a wave shape which curves up and down in a repetitious manner along the front-rear direction. According to this configuration, the bracket 26 has reinforced rigidity and the EA 30 is strongly supported by the bracket 26 from its inside.

Although in the present embodiment the cover plate 28 has a wave shape, the shape formed on the end 28*e* of the cover plate 28 is not limited to the wave shape. For example, the end 28*e* of the cover plate 28 may have a flat shape which does not comprise the plurality of first portions 28*a* and the plurality of second portions 28*b*. The projecting portion 26*e* of the bracket 26 also may not be limited to the wave shape. For example, the projecting portion 26*e* of the bracket 26 may be a flat shape which does not comprise the plurality of third portions 26*a* and the plurality of fourth portions 26*b*.

As mentioned above, when something collides the vehicle 10 on its lateral side, collision energy from the lateral side is absorbed by the EA 30. Due to this, the battery pack 24 is protected. The vehicle 10 of the present embodiment is configured such that collision energy absorption by the EA 30 can be improved.

In the vehicle 10 according to the present embodiment, the EA 30 comprises the inner part 31 and the outer part 32. The inner part 31 of the EA 30 has the cover plate 28 disposed below the battery pack 24 fixed thereto. Due to this, when collision load on the vehicle lateral side is applied on the EA 30, the EA 30 is supported by the cover plate 28 from the vehicle inner side. The outer part 32 of the EA 30 is enlarged downward relative to the inner part 31, and thus collision energy absorption amount by the outer part 32 upon deformation is relatively larger than the inner part 31. These features can allow to improve absorption by the EA 30 of collision energy. In addition, the plurality of first fasteners 34 fixing the cover plate 28 to the EA 30 is positioned higher than the lower surface 32*b* of the outer part 32 of the EA 30, these first fasteners 34 can be suppressed from coming into contact with foreign object(s).

As aforementioned, the EA 30 comprises a plurality of hollow spaces. A part of the plural hollow spaces is located in the outer part 32 of the EA 30, and another part of the plural hollow spaces is located in the inner part 31 of the EA 30. The outer part 32 of the EA 30 includes some hollow space(s) located on an upper level and other hollow space(s) located on a lower level. Contrary to this, the inner part 31 of the EA 30 only includes one or more hollow spaces located on the upper level. Due to this, the lower surface 32*b* of the outer part 32 of the EA 30 protrudes downward relative to the lower surface 31*b* of the inner part 31 of the EA 30.

In the present embodiment, the bracket 26 is arranged on the battery pack 24, and three members, i.e., the bracket 26, the cover plate 28, and the EA 30 are fastened altogether. This may not be limiting however, and the EA 30 and the bracket 26 may be fastened by another plural fasteners different from the plurality of first fasteners 34 fixing the cover plate 28 and the EA 30. Moreover, the bracket 26 may not be always necessary. Another part for fastening arranged on the battery pack 24, the cover plate 28, and the EA 30 may be fastened altogether. The other part for fastening may be for example the flange 24*f* of the battery pack 24.

What is claimed is:

1. A vehicle, comprising:
a floor panel;
a side sill extending along a side edge of the floor panel in a front-rear direction of the vehicle;
a battery pack located below the floor panel;
an energy absorber extending along a side surface of the battery pack in the front-rear direction and facing the side sill from below; and
a cover plate covering a lower surface of the battery pack from below,
wherein:
the energy absorber comprises an inner part facing the side surface of the battery pack and an outer part located outside in a left-right direction of the vehicle with respect to the inner part,
an end of the cover plate in the left-right direction is fixed to a lower surface of the inner part of the energy absorber with a plurality of fasteners,
a lower surface of the outer part protrudes downward relative to the lower surface of the inner part and is located lower than lower ends of the plurality of fasteners,
the end of the cover plate comprises a plurality of first portions and a plurality of second portions, wherein the first portions and the second portions are alternately arranged one by one along the front-rear direction,
the plurality of first portions comprises a plurality of fixed portions at each of which corresponding one of the plurality of fasteners is arranged, and
the plurality of second portions protrudes downward relative to the plurality of first portions.

2. The vehicle according to claim 1, wherein lower ends of the plurality of second portions are located lower than the lower ends of the plurality of fasteners.

3. The vehicle according to claim 1, further comprising a bracket facing an upper surface of the energy absorber and disposed on the side surface of the battery pack,
wherein
the inner part of the energy absorber is located between the bracket and the cover plate, and
the plurality of fasteners fastens the bracket, the cover plate, and the inner part of the energy absorber altogether.

4. The vehicle according to claim 3, wherein
the bracket comprises a plurality of third portions and a plurality of fourth portions, wherein the third portions and the fourth portions are alternately arranged one by one along the front-rear direction,
the plurality of third portions comprises a plurality of fixed portions at each of which corresponding one of the plurality of fasteners is arranged, and
the plurality of fourth portions protrudes upward relative to the plurality of third portions.

5. A vehicle, comprising:
a floor panel;
a side sill extending along a side edge of the floor panel in a front-rear direction of the vehicle;
a battery pack located below the floor panel;
an energy absorber extending along a side surface of the battery pack in the front-rear direction and facing the side sill from below;
a cover plate covering a lower surface of the battery pack from below; and
a bracket facing an upper surface of the energy absorber and disposed on the side surface of the battery pack, wherein:

the energy absorber comprises an inner part facing the side surface of the battery pack and an outer part located outside in a left-right direction of the vehicle with respect to the inner part, an end of the cover plate in the left-right direction is fixed to a lower surface of the inner part of the energy absorber with a plurality of fasteners, a lower surface of the outer part protrudes downward relative to the lower surface of the inner part and is located lower than lower ends of the plurality of fasteners, the inner part of the energy absorber is located between the bracket and the cover plate, and the plurality of fasteners fastens the bracket, the cover plate, and the inner part of the energy absorber altogether.

6. The vehicle according to claim 5, wherein the bracket comprises a plurality of third portions and a plurality of fourth portions, wherein the third portions and the fourth portions are alternately arranged one by one along the front-rear direction, the plurality of third portions comprises a plurality of fixed portions at each of which corresponding one of the plurality of fasteners is arranged, and the plurality of fourth portions protrudes upward relative to the plurality of third portions.

* * * * *